United States Patent [19]

Fukuzawa

[11] Patent Number: 5,543,980
[45] Date of Patent: Aug. 6, 1996

[54] TAPE LOADING DEVICE HAVING AN URGING ELEMENT FOR URGING A TAPE TENSION DETECTING ARM AFTER A PREDETERMINED ROTATION OF A DRIVING MEMBER

[75] Inventor: Keiichi Fukuzawa, Kanagawa-ken, Japan

[73] Assignee: Canon Kabushiki Kaisha, Tokyo, Japan

[21] Appl. No.: 259,357

[22] Filed: Jun. 13, 1994

Related U.S. Application Data

[63] Continuation of Ser. No. 851,735, Mar. 16, 1992, abandoned.

[51] Int. Cl.[6] ............................ G11B 15/43; G11B 15/66
[52] U.S. Cl. ............................ 360/85; 360/95; 242/334; 226/195
[58] Field of Search .................... 360/85, 95, 130.21, 360/74.3, 83; 242/334, 334.6, 410, 412, 416, 417.3, 419, 147 R; 226/195

[56] References Cited

U.S. PATENT DOCUMENTS

| | | | |
|---|---|---|---|
| 4,437,129 | 3/1984 | Yoshida et al. | 360/95 |
| 4,510,534 | 4/1985 | Maeda | 360/85 |
| 4,636,887 | 1/1987 | Kato et al. | 360/95 |
| 4,642,712 | 2/1987 | Kohda | 360/95 |
| 4,672,476 | 6/1987 | Saito et al. | 360/85 |
| 4,751,592 | 6/1988 | Hütter et al. | 360/95 |
| 5,070,422 | 12/1991 | Sasaki et al. | 360/85 |
| 5,099,371 | 3/1992 | Choi | 360/74.3 |
| 5,363,256 | 11/1994 | Kobayashi | 360/85 |

FOREIGN PATENT DOCUMENTS

3-252951  11/1991  Japan .................... 360/74.3

*Primary Examiner*—Stuart S. Levy
*Assistant Examiner*—Craig A. Renner
*Attorney, Agent, or Firm*—Robin, Blecker, Daley & Driscoll

[57] ABSTRACT

A tape loading device for use in a recording or reproducing apparatus has a first turning member having a tape guide which is kept in contact with a tape during running thereof and being turnable according to the tension of the tape, a second turning member for causing the first turning member to turn by its turning operation and loading the tape guide into a predetermined position, and a driving part for turning the second turning member. An urging member having two end portions is provided on the second turning member with the two end portions supported individually. The urging member is arranged so that only when the first turning member is located within a predetermined turning range, one of the two end portions is brought into engagement with an engagement part fixed to the driving part so that the urging member can generate an urging force for the first turning member.

5 Claims, 5 Drawing Sheets

FIG.6 ated divisional application under 37
TAPE LOADING DEVICE HAVING AN URGING ELEMENT FOR URGING A TAPE TENSION DETECTING ARM AFTER A PREDETERMINED ROTATION OF A DRIVING MEMBER This is a continuation divisional application under 37 CRF 1.62 of prior application Ser. No. 07/851,735, filed Mar. 16, 1992 now abandoned.

BACKGROUND OF THE INVENTION

1. Field of the Invention

The present invention relates to a loading mechanism suitable for use in a recording or reproducing apparatus.

2. Description of the Related Art

In a conventional recording or reproducing apparatus for recording video information on a magnetic tape or reproducing recorded video information, detecting means for detecting the motion of a tension detecting arm provided with a tension detecting roller for detection of a tape tension has been secured to a main chassis, whereas a tape has not been consistently kept in contact with the tape detecting roller during loading. For such reasons, it has been impossible to activate a tension detecting mechanism until a complete tape path is formed after the completion of the loading, with the result that it has been impossible to detect an abnormal tension which may occur during loading/unloading.

Figure 1:
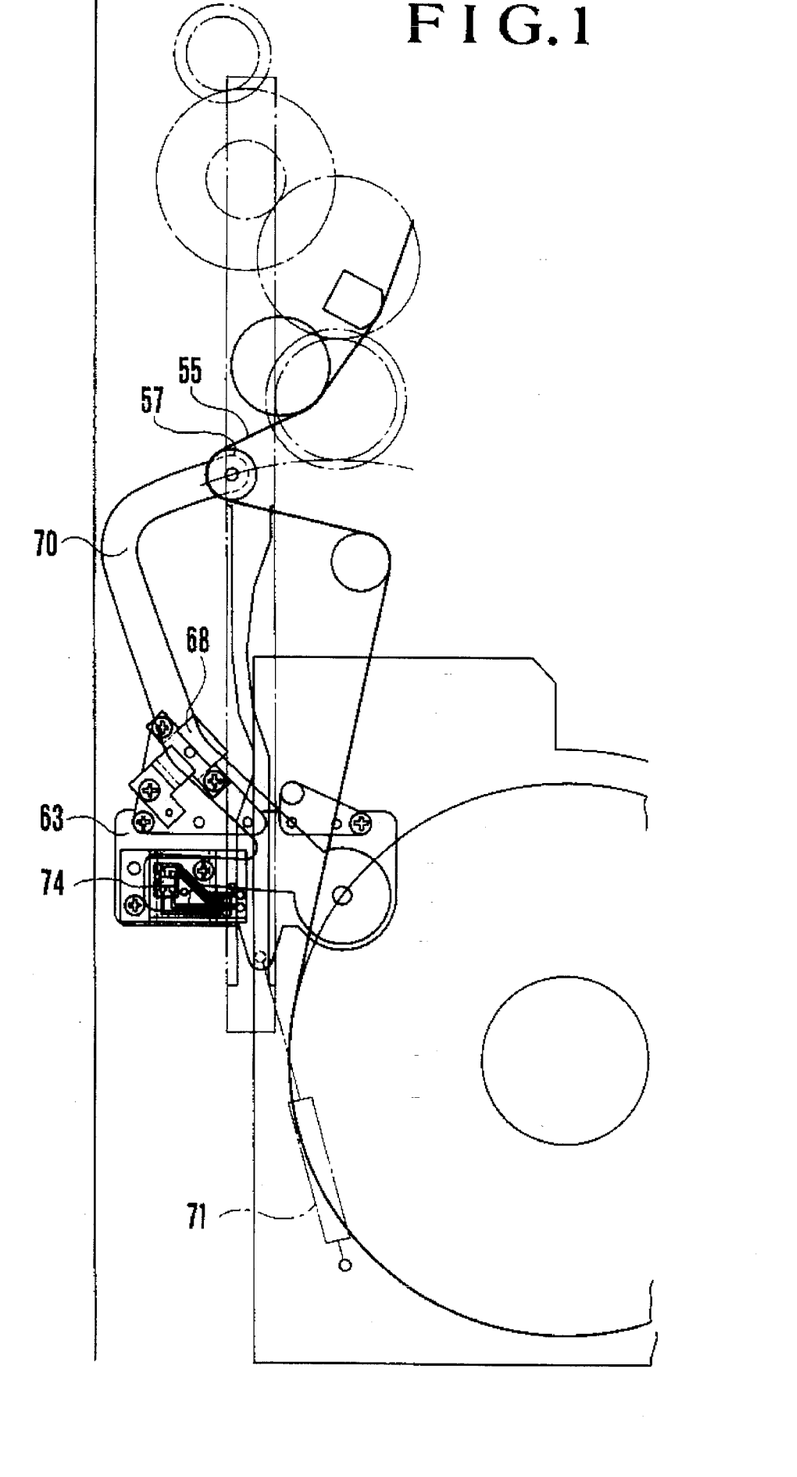
FIG. 1 is a schematic view of the essential parts of a related art which is to be improved on according to the present invention, and shows a state assumed by each of the essential parts when tape loading is completed.

To solve the above problems, a proposal has been made in U.S. patent application Ser. No. 690,648 filed on Apr. 24, 1991. The outline of the proposal is shown in FIG. 1. The proposed arrangement includes tape guiding means 57 for detecting a tape tension, a tape-tension detecting arm 70 supported for rotation at one end thereof and provided with the tape guiding means 57 at the other end, elastic supporting means 68 for elastically supporting the arm 70 in one rotational direction, and position detecting means 74 for detecting the motion of the arm 70. The elastic supporting means 68 and the position detecting means 74 are disposed on a common loading plate 63. The loading plate 63 is also provided with elastic means 71 for maintaining a tape 55 in consistent contact with the tape guiding means 57 while the tape 55 is being loaded/unloaded.

With the above-described arrangement, it may be possible to solve the above problems of the conventional recording or reproducing apparatus. However, in such an arrangement, load is consistently applied to the elastic means 71 during loading or unloading and, in addition, a large load is applied during unloading when compared to during loading. Accordingly, to cause the aforesaid mechanism to operate stably, it is necessary to reinforce a loading driving member and a loading motor. As a result, it has been difficult to further miniaturize the apparatus.

In general, many types of recording or reproducing apparatus employ motors as driving sources for implementing tape loading. However, since the stop position of such a motor tends to fluctuate, it has been difficult to determine accurately a position where a tape guide for detection of a tape tension is to be located when unloading is completed. For this reason, there has been a risk that the tape guide interferes with a cassette half, a tape reel or the tape wound around the tape reel. To solve such a problem, a loading unit is provided with a charging mechanism, and overcharging is performed upon completion of unloading.

However, such a mechanism has a complicated structure and requires a considerable area for installation, and it has been difficult to further miniaturize the apparatus as far as the mechanism is used.

SUMMARY OF THE INVENTION

It is, therefore, a first object of the present invention to provide a recording or reproducing apparatus of reduced size which is an improvement over the above-described proposal in spite of a simple construction.

A second object of the present invention is to provide a recording or reproducing apparatus having a loading mechanism which does not generate a larger load than is necessary.

To achieve the above objects, in accordance with one aspect of the present invention, there is provided an arrangement which includes a first turning member having a tape guide which is kept in contact with a tape during running thereof and being turnable according to the tension of the tape, a second turning member for causing the first turning member to turn by its turning operation and loading the tape guide into a predetermined position, and a driving part for turning the second turning member. An urging member having two end portions is provided on the second turning member with the two end portions supported individually. The urging member is arranged so that only when the first turning member is located within a predetermined turning range, one of the two end portions is brought into engagement with an engagement part fixed to the driving part so that the urging member can generate an urging force for the first turning member.

A third object of the present invention is to provide a recording or reproducing apparatus having a loading mechanism which can accurately determine a position where a tape guide is to be located when unloading is completed.

To achieve the above object, in accordance with another aspect of the present invention, there is provided an arrangement which includes a turning unit having a tape guide which is kept in contact with a tape during running thereof and being capable of turning freely, a driving part for loading the turning unit into a predetermined position, elastic means for enabling a driving force of the driving part to be transmitted to the tape guide during unloading of the tape, and a positioning part for enabling the tape guide to be located in a predetermined position during the unloading of the tape.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 2:
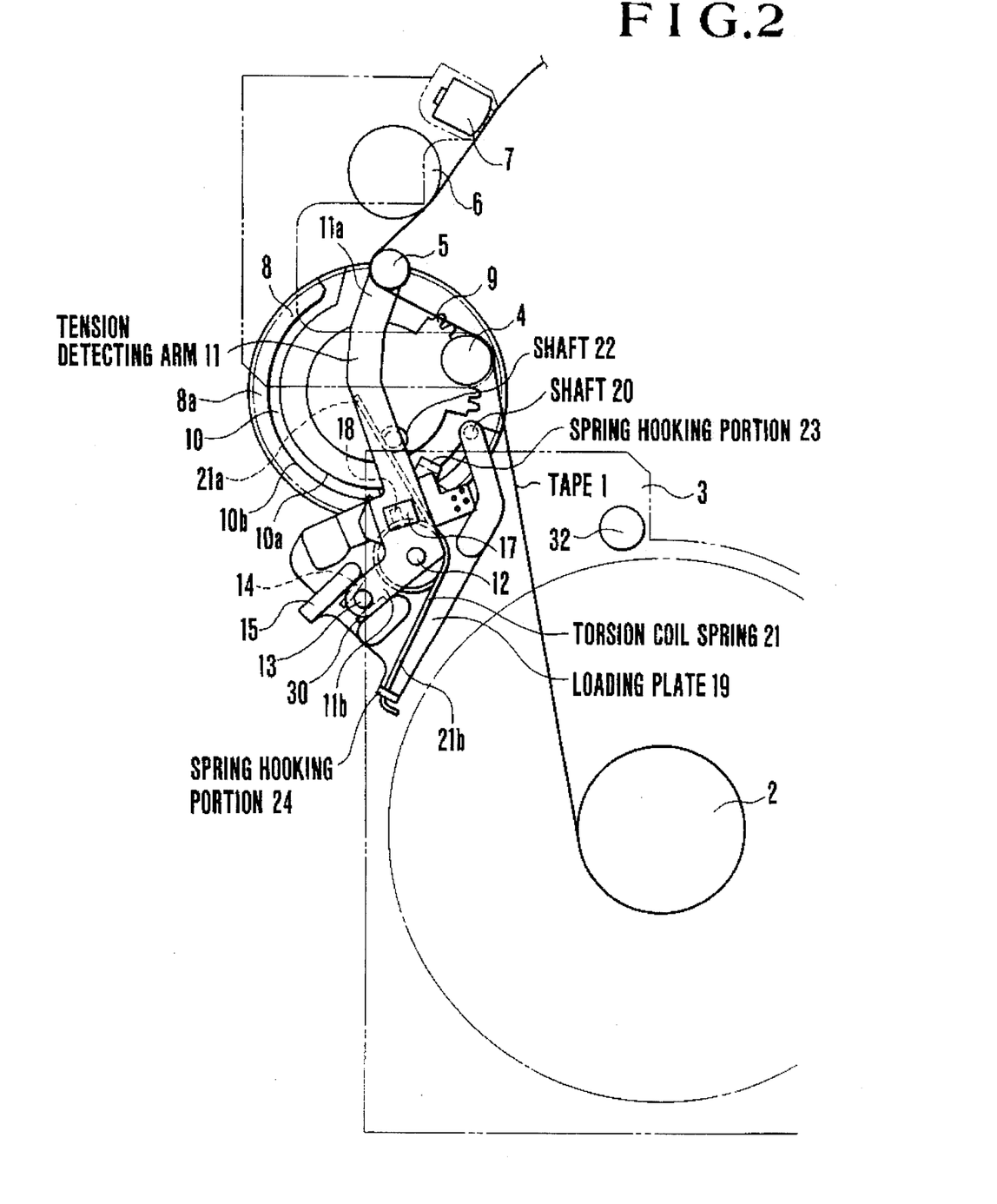
FIG. 2 is a schematic view of the essential parts of a first embodiment of the present invention, and shows a state assumed by each of them when tape loading is completed.

FIG. 2 is a front elevational view showing the essential parts of a first embodiment. The arrangement shown in FIG. 2 includes a reel 2 around which a magnetic tape (tape) 1 is wound, a cassette 3 in which the tape 1 is accommodated, tape guide rollers 4 and 6, a tension detecting roller 5 for detecting the tension of the tape 1 (hereinafter referred to as the "detecting guide"), and a stationary head 7. The shown arrangement also includes a loading gear unit (gear unit) 8 which serves as a driving part for causing the detecting guide 5 to move, and a gear portion 8a is provided in the lower portion of the loading gear unit 8 and a groove 10 having cam walls 10a and 10b is formed in the gear portion 8a. The groove 10 guides a shaft 20 which is disposed to extend from the bottom face of a loading plate (hereinafter referred to as the "plate") 19 in a direction transverse thereto. The plate 19 serves as a second turning member.

Figure 3:
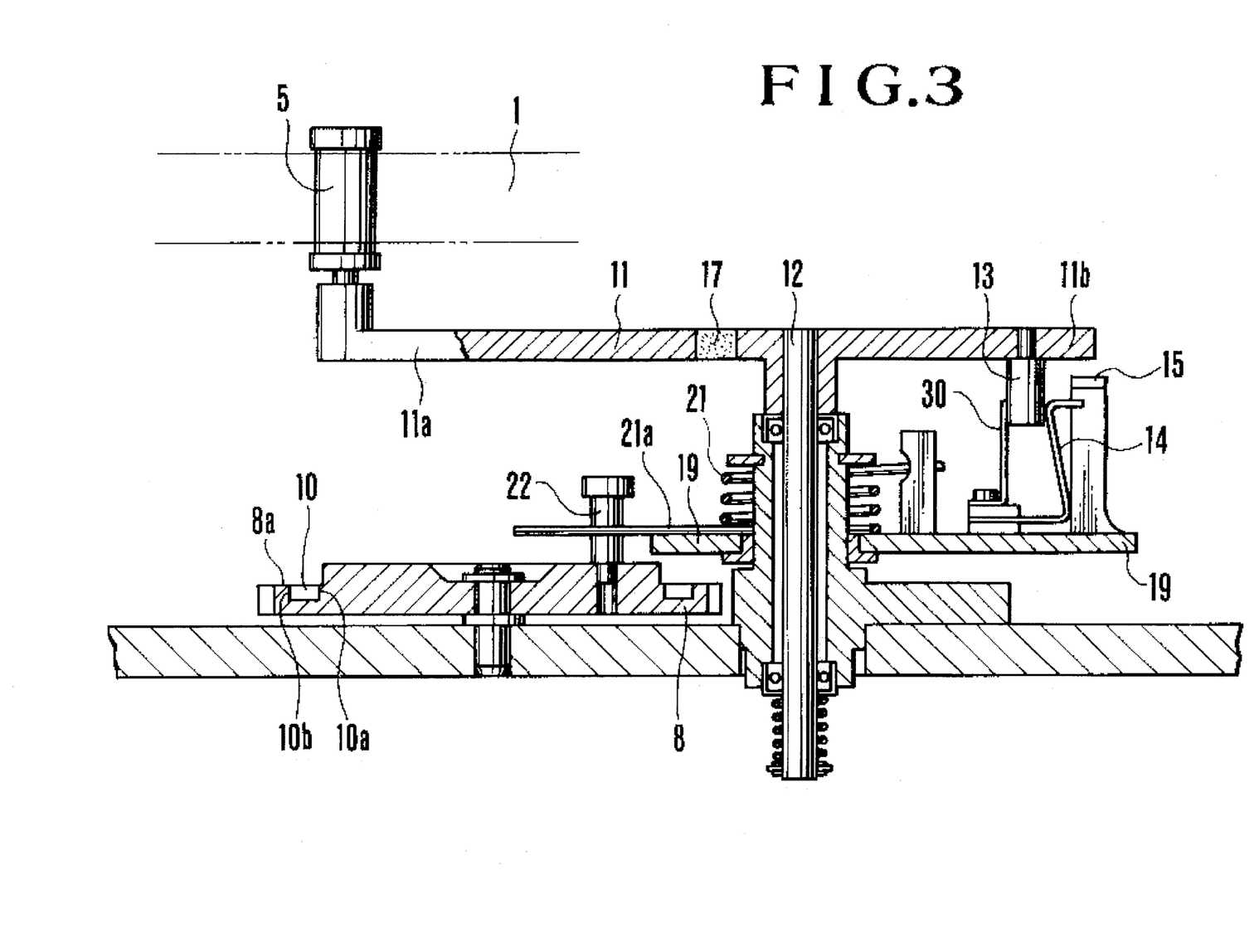
FIG. 3 is a schematic explanatory view showing in cross section a loading gear unit used in the first embodiment.

As shown in FIG. 3, a shaft 22 is disposed to extend from the upper portion of the gear unit 8 in a direction transverse thereto, so as to press an end portion 21a of a torsion coil spring 21 which serves as an urging member wound around a shaft 12.

Referring back to FIG. 2, spring hooking portions 23 and 24 are provided on the plate 19 so as to support opposite end portions 21a and 21b of the torsion coil spring 21, respectively. The torsion coil spring 21 presses the plate 19 downward as viewed in FIG. 3.

Referring again to FIG. 2, a tension detecting arm (hereinafter referred to as the "detecting arm") 11 serves as a first turning member which is disposed for turning motion on the rotating shaft 12, and the aforesaid detecting guide 5 is provided at one end 11a of the detecting arm 11. The other end 11b of the detecting arm 11 has a shaft 13 which extends from the detecting arm 11 downward in a direction transverse thereto, as shown in FIG. 3. The shaft 13 is elastically supported by a leaf spring 14 so as to rotate around the rotating shaft 12 in the left-handed direction as viewed in FIG. 3. The motion of the shaft 13 is limited by a limiter 15 so that the shaft 13 does not move beyond a predetermined amount. An elastic limiter 30 made from a leaf spring is capable of elastically limiting the motion of the detecting arm 11 with respect to the direction of rotation of the shaft 13 urged by the leaf spring 14.

Figure 4:
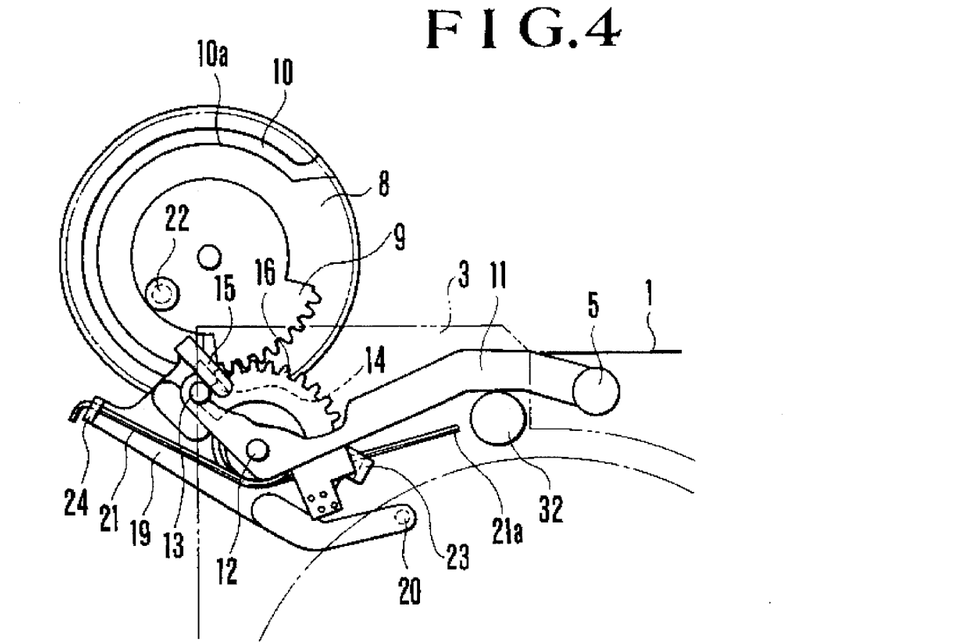
FIG. 4 is a schematic view of the essential parts of the first embodiment, and shows a state assumed by each of them when tape unloading is completed.

Accordingly, the detecting arm 11 is angularly displaced in proportion to the magnitude of a tape tension applied to the detecting guide 5. The motion of the detecting arm 11 is detected by means of a magnet 17 provided in the detecting arm 11 and a Hall element 18 for converting a change in a magnetic field into an electrical signal. The leaf spring 14, the limiter 15 and the Hall element 18 are all fixed to the plate 19. Further, as shown in FIG. 4, a gear portion 16 is disposed below the plate 19 at a position where the gear portion 16 can mesh with an intermittent gear 9.

Although not described above in detail, in the recording or reproducing apparatus according to this embodiment, the tape 1 accommodated in the cassette 3 is drawn out by the detecting guide 5 as well as a guide member (not shown), and is then brought into abutment with a rotary drum provided with a plurality of recording or reproducing heads (not shown), thereby performing recording or reproduction of information.

Detection of a tape tension will be described below. Referring to FIG. 2, the detecting arm 11 is subjected to right-handed turning moment according to a tape tension through the detecting guide 5. Since the detecting arm 11 is also subjected to left-handed turning moment by the leaf spring 14 at the same time, the detecting arm 11 is angularly displaced by an amount approximately equivalent to the difference between the right-handed turning moment and the left-handed turning moment. The motion of the detecting arm 11 is detected and converted into an electrical signal by the cooperation between the magnet 17 and the Hall element 18.

A loading operation will be described below with reference to FIG. 4. A loading motor (not shown) is activated to cause the gear unit 8 to rotate in the right-handed direction. At this time, the intermittent gear 9 and the gear portion 16 mesh with each other to cause the plate 19 to rotate about the shaft 12 in the left-handed direction.

At this time, the leaf spring 14, which is in contact with the shaft 13 which extends from the detecting arm 11 in a direction transverse thereto, is elastically deformed, and the shaft 13 is brought into abutment with the limiter 15. Accordingly, the detecting arm 11 having the shaft 13 starts to rotate on the shaft 12 in the left-handed direction, and the tape 1 accommodated in the cassette 3 is drawn out by the detecting guide 5.

During this time, since the torsion coil spring 21 is supported by the spring hooking portions 23 and 24 provided on the plate 19, the torsion coil spring 21 exerts no force in the direction of rotation of the plate 19.

As described above, after a loading operation has been started, while the intermittent gear 9 and the gear portion 16 are in mesh, the plate 19 continues rotating in the left-handed direction. Subsequently, when the mesh of the intermittent gear 9 with the gear portion 16 is released, the shaft 20, which extends from the plate 19 in a direction transverse thereto, comes into engagement with the groove 10 formed in the gear unit 8. The shaft 20 is guided along the groove 10, according to the rotation of the gear unit 8. In this case as well, the plate 19 is not subjected to any force that is generated in the direction of rotation of the plate 19 by the torsion coil spring 21.

When the gear unit 8 rotates to a further extent, the end portion 21a of the torsion coil spring 21 is pressed against the shaft 22 which extends from the gear unit 8 in a direction transverse thereto. Accordingly, the end portion 21a is forced away from the spring hooking portion 23, so that left-handed turning moment is applied to the plate 19, thereby bringing the shaft 20 into abutment with the cam wall 10a. Subsequently, the loading operation is continued, and is completed when the state shown in FIG. 2 is reached.

To implement both a reduction in the number of parts and a reduction in the size of the apparatus, the above-described embodiment is arranged so that the shaft 20 and the groove 10 are brought into engagement with each other to achieve loading after the mesh of the intermittent gear 9 with the gear portion 16 has been released. However, another urging means may be disposed so that the plate 19 is pressed toward the gear unit 8 after the mesh of the intermittent gear 9 with the gear portion 16 has been released.

If the tape 1 is to be unloaded into the cassette 3, an operation which is reverse to the above-described loading operation is performed. Specifically, the loading motor (not shown) is activated to cause the gear unit 8 to rotate in the left-handed direction. At this time, the intermittent gear 9 and the gear portion 16 mesh with each other to cause the plate 19 to rotate about the shaft 12 in the right-handed direction. Accordingly, the detecting arm 11, which has the shaft 13 elastically supported on the elastic limiter 30 provided on the plate 19, starts to rotate on the shaft 12 in the right-handed direction. Thus, the tape 1 is unloaded. The unloading operation proceeds until the detecting arm 11 comes into abutment with a positioning pin 32. While the detecting arm 11 abuts against the positioning pin 32, if the gear unit 8 is made to rotate to a further extent, the plate 19 also turns to a further extent. However, the detecting arm 11 whose motion is limited by the elastic limiter 30 does not turn any further owing to the positioning pin 32, whereby the motion of the plate 19 is absorbed by the elastic deformation of the elastic limiter 30. Accordingly, the detecting arm 11 is pressed against the positioning pin 32 owing to a charging force generated from the elastic deformation of the elastic limiter 30. In consequence, the position of the detecting guide 5 is determined accurately. The detecting guide 5 does not interfere with the body of the cassette 3, the wound tape 1, the reel 2 or others.

In the first embodiment, the shaft 13 is provided on the detecting arm 11, while the leaf spring 14 and the elastic limiter 30 are provided on the plate 19. However, the shaft 13 may be provided on the plate 19, and the leaf spring 14 and the elastic limiter 30 may be provided on the detecting arm 11.

Figure 5:
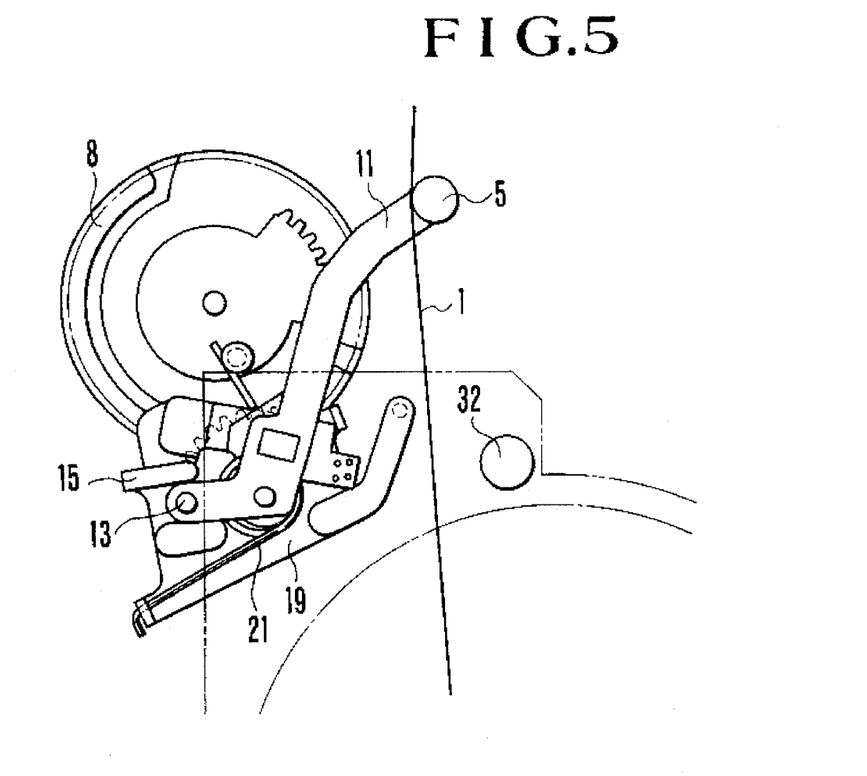
FIG. 5 is a schematic view of the essential parts of the first embodiment, and shows a state assumed by each of them when an excessive tension is applied.

The operation of a tape-tension buffering mechanism will be described below with reference to FIG. 5. FIG. 5 shows a state in which an excessive tension is temporarily applied to the tape 1. If an excessive tension is applied to the tape 1, the detecting arm 11 is made to rotate toward the right by the detecting guide 5, and right-handed turning moment is applied to the plate 19 through the shaft 13 and the limiter 15 which are provided on the detecting arm 11. During this time, the plate 19 is subjected to left-handed turning moment owing to the torsion coil spring 21. Accordingly, if the right-handed turning moment due to the tape tension becomes greater than the left-handed turning moment due to the torsion coil spring 21, the plate 19 rotates toward the right, as viewed in FIG. 5, thereby buffering the temporary excessive tension.

As is apparent from the above description, the first embodiment is provided with the urging member for urging a turning unit, more specifically, the second turning member against a tape tension, and the urging member is arranged to engage with the driving part for turning the second turning member and generate an urging force, only when the first turning member is located within a predetermined turning range. Accordingly, no additional torque is produced during loading.

Since the torsion coil spring is used as the urging member, the operation of urging the second turning member about the turning axis thereof can also be achieved without a special member, so that the number of parts can be reduced.

Furthermore, the second turning member and the driving part are provided with the respective gear portions which can mesh with each other, and either of the second turning member and the driving part has an engagement portion and the other has an engagement groove for engagement with the engagement portion. The engagement portion and the engagement groove are brought into engagement with each other when the mesh of the gear portions is released. Accordingly, it is possible to achieve the above-described advantage without providing any special urging means for the second turning member. Therefore, it is also possible to further miniaturize the apparatus.

A positioning mechanism according to a second embodiment for performing positioning upon completion of tape unloading will be described below.

Figure 6:
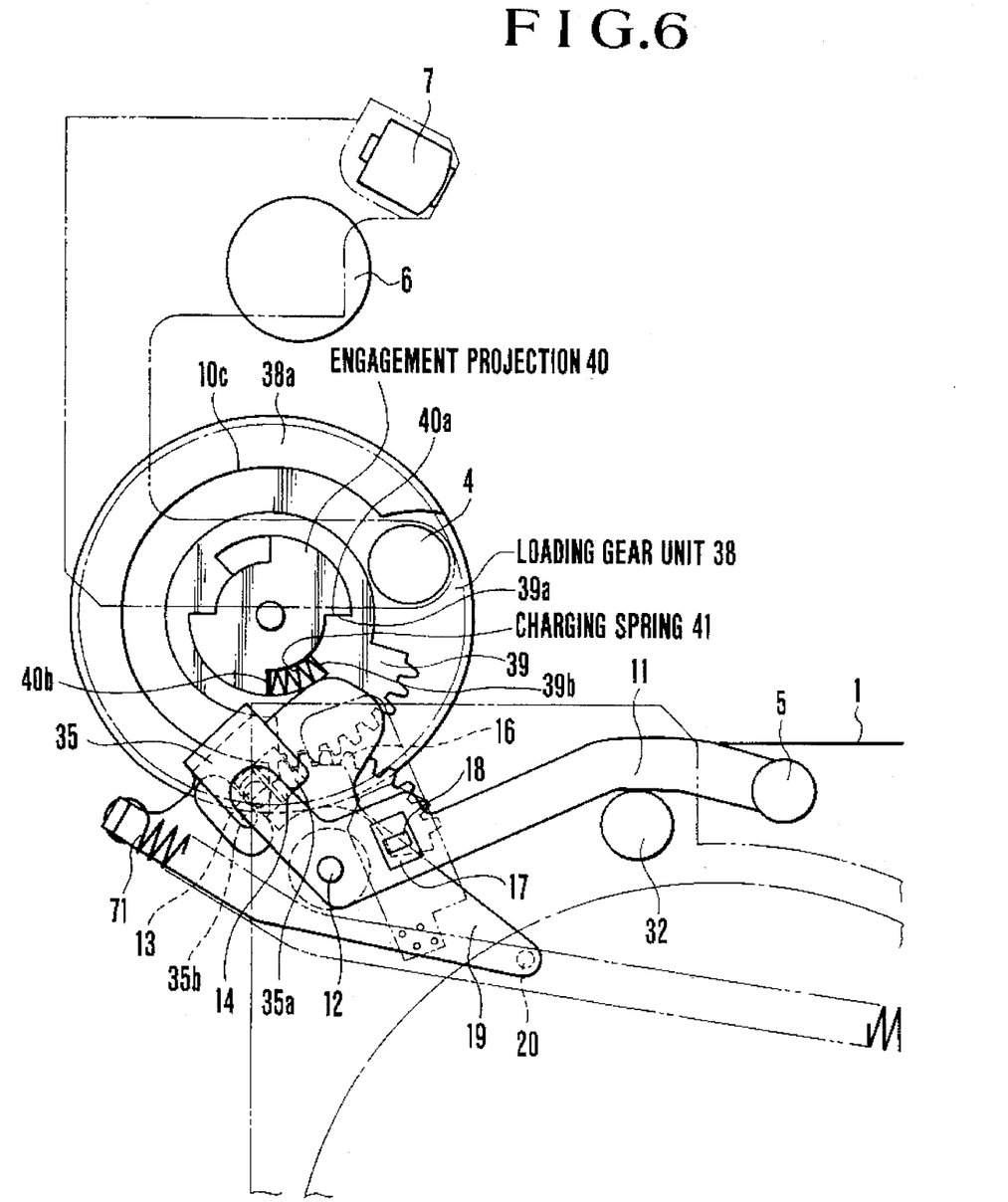
FIG. 6 is a schematic view of the essential parts of a second embodiment, and shows a state in which tape unloading is completed.

FIG. 6 shows in front elevation the essential parts of the second embodiment of the present invention. In FIG. 6, the same reference numerals are used to denote elements whose functions are substantially identical to those of the elements used in the first embodiment described above, and the description thereof is omitted.

Referring to FIG. 6, a loading gear unit 38 serves as a driving part for causing the detecting guide 5 to move, and the cam wall 10c is formed in a gear portion 38a provided in the lower portion of the loading gear unit 38. An engagement projection 40 which serves as a coupling part is formed in the middle of the gear portion 38a, and the engagement projection 40 engages with an upper gear 39 with a charging spring 41 interposed therebetween.

During tape loading, an engagement end 40a of the engagement projection 40 directly presses an engagement end 39a of the upper gear 39 to cause the upper gear 39 to rotate toward the right as viewed in FIG. 6. At this time, the gear portion 16 which is meshed with the upper gear 39 rotates toward the left. Accordingly, the plate 19 on which the gear portion 16 is formed rotates toward the left as well. When a first end portion 35a of a limiter 35 provided on the plate 19 presses the shaft 13 which extends from the detecting arm 11 in a direction transverse thereto, the detecting arm 11 starts to rotate toward the left. Thus, loading of the tape 1 is started.

Unloading of the tape 1 is performed in the following manner. The engagement projection 40 rotates toward the left to cause an engagement end 40b to press an engagement end 39b of the upper gear 39 through the charging spring 41. The upper gear 39 causes the plate 19 to rotate toward the right through the gear portion 16. At this time, a second end portion 35b of the limiter 35 on the plate 19 presses the shaft 13 which extends from the detecting arm 11 in a direction transverse thereto, thereby causing the detecting arm 11 to rotate toward the right. The unloading operation proceeds until the detecting arm 11 comes into abutment with the positioning pin 32. While the detecting arm 11 abuts against the positioning pin 32, if the gear unit 8 is made to rotate to a further extent, the plate 19 also turns to a further extent. However, the detecting arm 11 does not turn any further owing to the positioning pin 32, and the motion of the plate 19 is absorbed by the elastic deformation of the charging spring 41. Accordingly, the detecting arm 11 is pressed against the positioning pin 32 owing to a charging force generated from the elastic deformation of the charging spring 41. In consequence, the position of the detecting guide 5 is determined accurately.

As is apparent from the above description, in the second embodiment, the elastic means is disposed so that the driving force of the driving part can be transmitted to the tape guide provided on the turning unit during tape unloading, as in the case of the first embodiment described above, whereby the tape guide can be located in a predetermined position by a positioning part. Accordingly, a position where the tape guide is to be located when unloading is completed can be determined accurately through an extremely simple mechanism.

As described above, in the first embodiment described previously, the turning unit is composed of the first and second turning members and the elastic means is disposed between the two turning members. In the second embodiment described above, the coupling part is provided which enables the driving force of the driving part to be transmitted during the loading or unloading of the tape, and the elastic means is disposed between the coupling part and the driving part and, in addition, the coupling part is formed on the driving part. Accordingly, it is possible to utilize efficiently a conventional dead space as a place for installation of the elastic means, whereby further miniaturization of the apparatus can be achieved.

What is claimed is:

1. An apparatus for enabling information to be recorded or reproduced on or from a tape-shaped recording medium, comprising:

(a) a guide member for guiding the tape-shaped recording medium to a predetermined tape path;

(b) a first turning member having a tape guide which is kept in contact with the tape-shaped recording medium during running of said recording medium, said first turning member being turnable according to a tension of the tape-shaped recording medium;

(c) a second turning member for causing said first turning member to turn by a turning operation of said second turning member and loading the tape guide into a predetermined position;

(d) a driving part for turning said second turning member; and (e) an urging member having two end portions, said urging member being provided on said second turning member with the two end portions supported individually, said second turning member being turned by said driving part to bring one of the two end portions into engagement with an engagement part fixed to said driving part so that said urging member generates an urging force for said first turning member.

2. A tape loading device comprising:

(a) a first turning member having a tape guide which is kept in contact with a tape during running of the tape, said first turning member being turnable according to a tension of the tape;

(b) a second turning member for causing said first turning member to turn by a turning operation of said second turning member and loading the tape guide into a predetermined position;

(c) a driving part for turning said second turning member; and (d) an urging member having two end portions, said urging member being provided on said second turning member with the two end portions supported individually, said second turning member being turned by said driving part to bring one of the two end portions into engagement with an engagement part fixed to said driving part so that said urging member generates an urging force for said first turning member.

3. A device according to claim 2, wherein said urging member is a torsion coil spring having a coil portion which is formed to surround a turning axis of said second turning member.

4. A device according to claim 3, wherein said second turning member and said driving part have gear portions which mesh with each other, said driving part turning said second turning member while said gear portions mesh with each other, said second turning member being turned by said driving part to a position in which a mesh of the gear portions is released, one of said second turning member and said driving part having an engagement portion and the other having an engagement groove for engagement with the engagement portion, the engagement portion and the engagement groove coming into engagement with each other when said mesh of the gear portions is released.

5. A device according to claim 2, further comprising: (a) elastic means for enabling a driving force of said driving part to be transmitted to the tape guide during tape unloading; and (b) a positioning part for enabling the tape guide to be located in a predetermined position during tape unloading.

* * * * *

UNITED STATES PATENT AND TRADEMARK OFFICE
CERTIFICATE OF CORRECTION

PATENT NO. : 5,543,980

DATED : August 6, 1996

INVENTOR(S): Keiichi Fukuzawa

It is certified that error appears in the above-identified patent and that said Letters Patent is hereby corrected as shown below:

On the cover page, after Item [22], insert

-- [30] Foreign Application Priority Data

March 27, 1991 [JP] Japan................03-063197
April 3, 1991 [JP] Japan................03-071054 --.

Signed and Sealed this

Twenty-seventh Day of May, 1997

Attest:

BRUCE LEHMAN

Attesting Officer

Commissioner of Patents and Trademarks